United States Patent
Khinkis et al.

(10) Patent No.: US 7,963,328 B2
(45) Date of Patent: Jun. 21, 2011

(54) PROCESS AND APPARATUS FOR RELEASE AND RECOVERY OF METHANE FROM METHANE HYDRATES

(75) Inventors: Mark J. Khinkis, Morton Grove, IL (US); Hamid A. Abbasi, Naperville, IL (US); Kent Perry, Schaumburg, IL (US)

(73) Assignee: Gas Technology Institute, Des Plaines, IL (US)

( * ) Notice: Subject to any disclaimer, the term of this patent is extended or adjusted under 35 U.S.C. 154(b) by 302 days.

(21) Appl. No.: 12/413,616

(22) Filed: Mar. 30, 2009

(65) Prior Publication Data
US 2010/0243245 A1 Sep. 30, 2010

(51) Int. Cl.
*E21B 36/00* (2006.01)
*E21B 36/02* (2006.01)
*E21B 43/24* (2006.01)
*E21B 43/38* (2006.01)
*E21B 47/06* (2006.01)

(52) U.S. Cl. .............. 166/265; 166/53; 166/57; 166/59; 166/64; 166/66; 166/250.15; 166/302; 166/303; 405/129.35

(58) Field of Classification Search ........................ None
See application file for complete search history.

(56) References Cited

U.S. PATENT DOCUMENTS

| | | | |
|---|---|---|---|
| 5,261,490 A | 11/1993 | Ebinuma | |
| 6,394,791 B2 * | 5/2002 | Smith et al. | 431/170 |
| 6,973,968 B2 | 12/2005 | Pfefferle | |
| 6,978,837 B2 * | 12/2005 | Yemington | 166/303 |
| 7,343,971 B2 * | 3/2008 | Pfefferle | 166/260 |
| 7,905,290 B2 * | 3/2011 | Schicks | 166/302 |
| 2005/0103498 A1 * | 5/2005 | Yemington | 166/302 |
| 2005/0252656 A1 * | 11/2005 | Maguire | 166/256 |
| 2005/0284628 A1 * | 12/2005 | Pfefferle | 166/260 |
| 2006/0070732 A1 * | 4/2006 | Schicks | 166/248 |
| 2008/0121393 A1 * | 5/2008 | Pfefferle | 166/257 |
| 2010/0006287 A1 * | 1/2010 | Schicks | 166/272.1 |
| 2010/0048963 A1 * | 2/2010 | Jones et al. | 585/15 |

OTHER PUBLICATIONS

Marshall, Michael, "Ice that burns could be a green fossil fuel", http://www.newscientist.com/article/dn16848-ice-that-burns-could-be-a-green-fossil-fuel.html, Mar. 26, 2009.

* cited by examiner

*Primary Examiner* — George Suchfield
(74) *Attorney, Agent, or Firm* — Mark E. Fejer

(57) ABSTRACT

A process and system for release and recovery of methane from subterranean methane hydrate deposits in which heated $CO_2$ is used to displace methane from the methane hydrate deposits and a portion of the displaced methane is routed to a combustion device proximate the deposit for combustion in-situ, generating heated $CO_2$ which is introduced into the deposit, displacing additional methane, a portion of which is routed to the combustion device, thereby providing a substantially self-sustaining process. Portions of the displace methane not routed to the combustion device are captured for use elsewhere.

17 Claims, 3 Drawing Sheets

US 7,963,328 B2

PROCESS AND APPARATUS FOR RELEASE AND RECOVERY OF METHANE FROM METHANE HYDRATES

BACKGROUND OF THE INVENTION

1. Field of the Invention

This invention relates to a method and apparatus or system for recovering methane from methane hydrates. In one aspect, this invention relates to a method and apparatus for recovering methane from subterranean methane hydrate deposits. In another aspect, this invention relates to a method and apparatus for in situ recovery of methane from subterranean methane hydrate deposits.

2. Description of Related Art

Methane hydrate, also known as methane clathrate, is a cage-like lattice of ice inside which are trapped molecules of methane, the primary component of natural gas. If methane hydrate is either warmed or depressurized, it reverts back to methane and water. Methane hydrate fields or deposits generally occur under the Arctic permafrost or beneath the ocean floor. While global estimates vary considerably, the energy content of methane occurring in hydrate form is immense, possibly exceeding the combined energy content of all other known fossil fuels. However, future production volumes are speculative because methane production from hydrate has not been documented beyond small-scale field experiments. Thus, with the known reserves of oil and non-hydrate gas diminishing on a daily basis, the need for a viable method for large-scale removal and recovery of this heretofore untapped reserve of methane is substantial.

There are at present three approaches for the in-situ release and recovery of methane from a methane hydrate deposit or field. The first of these involves heating the methane hydrate, which requires only a small percentage of the heating value of the trapped methane. Under this approach, a heated fluid is pumped down to the subterranean methane hydrate deposit. It has been found, however, that, because of heat losses incurred during transmission of the heated fluid to the methane hydrate deposit, the amount of energy required to supply the required heat into the methane hydrate deposit nearly equals the heating value of the released methane. In-situ combustion could reduce such heat losses, but is said to be difficult to establish in a hydrate deposit and would result in undesirably high hydrate deposit temperatures.

The second approach involves reducing the in-situ pressure to a value below the dissociation pressure of the methane hydrate deposit. However, the energy required for methane dissociation must still be provided to the hydrate deposit. As a consequence, the methane hydrate deposit temperature decreases, thereby requiring even lower dissociation pressures or heating of the hydrate deposit. Thus, with this approach, it is necessary to mine the solid methane hydrates and pump a slurry to the surface. To date, no such mining system has been demonstrated to be economically feasible.

The third approach involves pumping carbon dioxide downhole to displace methane from the methane hydrates by formation of carbon dioxide hydrates. However, at the temperatures of the methane hydrate deposit, the reaction is prohibitively slow. In addition, under the conditions of a stable hydrate bed, methane hydrate reforms from available methane and water. Thus, to minimize the reformation of methane hydrate, it is necessary to heat the hydrate deposit.

U.S. Pat. No. 6,973,968 B2 to Pfefferle teaches a method and system for dissociating methane hydrate deposits in-situ in which an oxidizer fluid and a fuel supply, both at a pressure higher than that of the methane hydrate deposit, are supplied and delivered to the methane hydrate deposit and the fuel is combusted downhole using the oxidizer fluid to provide combustion products, which are placed in contact with a diluent fluid to produce a heated product fluid. The heated product fluid is injected into the methane hydrate deposit whereby methane is dissociated from the methane hydrate and made available for extraction. In accordance with one embodiment, carbon dioxide is provided to the methane hydrate deposit to promote the formation of carbon dioxide hydrates from the liberated methane hydrate water. Disadvantageously, all of the fluids, i.e. fuel, oxidizer, and $CO_2$, required for implementation of this method are transported from sources above ground to the methane hydrate deposit, requiring substantial expenditures of energy and reducing the net heating value of the extracted methane.

SUMMARY OF THE INVENTION

It is, thus, one object of this invention to provide a process and system for release and recovery of methane from a methane hydrate deposit or field which reduces the expenditure of energy required and increases the net heating value of the recovered methane as compared with known processes and systems.

This and other objects of this invention are addressed by a process for release and recovery of methane from subterranean methane hydrate deposits in which methane from the subterranean methane hydrate deposit, referred to herein generally as combustion methane, and a combustion oxidant are provided to a combustion zone proximate the subterranean methane hydrate deposit and reacted, combusting the combustion methane utilizing the combustion oxidant, and generating heated $CO_2$. The heated $CO_2$ is introduced directly from the combustion zone into the subterranean methane hydrate deposit, resulting in the displacement of methane therefrom. A portion of the displaced methane is diverted to the combustion zone for reaction with the combustion oxidant and the remaining portion of the displaced methane is recovered for use elsewhere. By utilizing a portion of the displaced methane directly from the methane hydrate deposit, the pumping of the fuel from above ground as is conventional, and thus, the associated energy consumption and costs are eliminated. In accordance with one embodiment of this invention, the heated $CO_2$ is produced by catalytic combustion of the combustion methane. In accordance with another embodiment, the heated $CO_2$ is produced by non-catalytic combustion of the combustion methane and combustion oxidant.

To initiate the process of this invention, it is necessary to provide an initial amount of combustion methane to initiate the combustion process. In accordance with one embodiment, this initial step is achieved by heating the methane hydrate deposit, resulting in the release of methane, which is diverted to the combustor for combustion. In accordance with another embodiment, this initial step is achieved by providing an amount of preheated $CO_2$ to the methane hydrate deposit, resulting in displacement of methane from the methane hydrate deposit by the $CO_2$, which replaces the displaced methane, forming a $CO_2$ hydrate.

The system for implementing the method of this invention comprises a combustion oxidant conduit having a combustion oxidant inlet end connected with a combustion oxidant source and having a combustion oxidant outlet end proximate a subterranean methane hydrate deposit, a combustor disposed proximate the subterranean methane hydrate deposit having a combustor oxidant inlet in fluid communication with the combustion oxidant outlet end of the combustion oxidant conduit, whereby combustion oxidant flowing through the combustion oxidant conduit is able to be provided to the combustor, and having a combustion methane inlet in fluid communication with the subterranean methane hydrate deposit and having a combustion products outlet end in fluid communication with the subterranean methane hydrate deposit, combustor ignition means for igniting the combustor, and a displaced methane conduit having a displaced methane inlet in fluid communication with the subterranean methane hydrate deposit. In accordance with one embodiment of this invention, the combustor is a catalytic combustor. In accordance with another embodiment of this invention, the combustor is a non-catalytic combustor.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
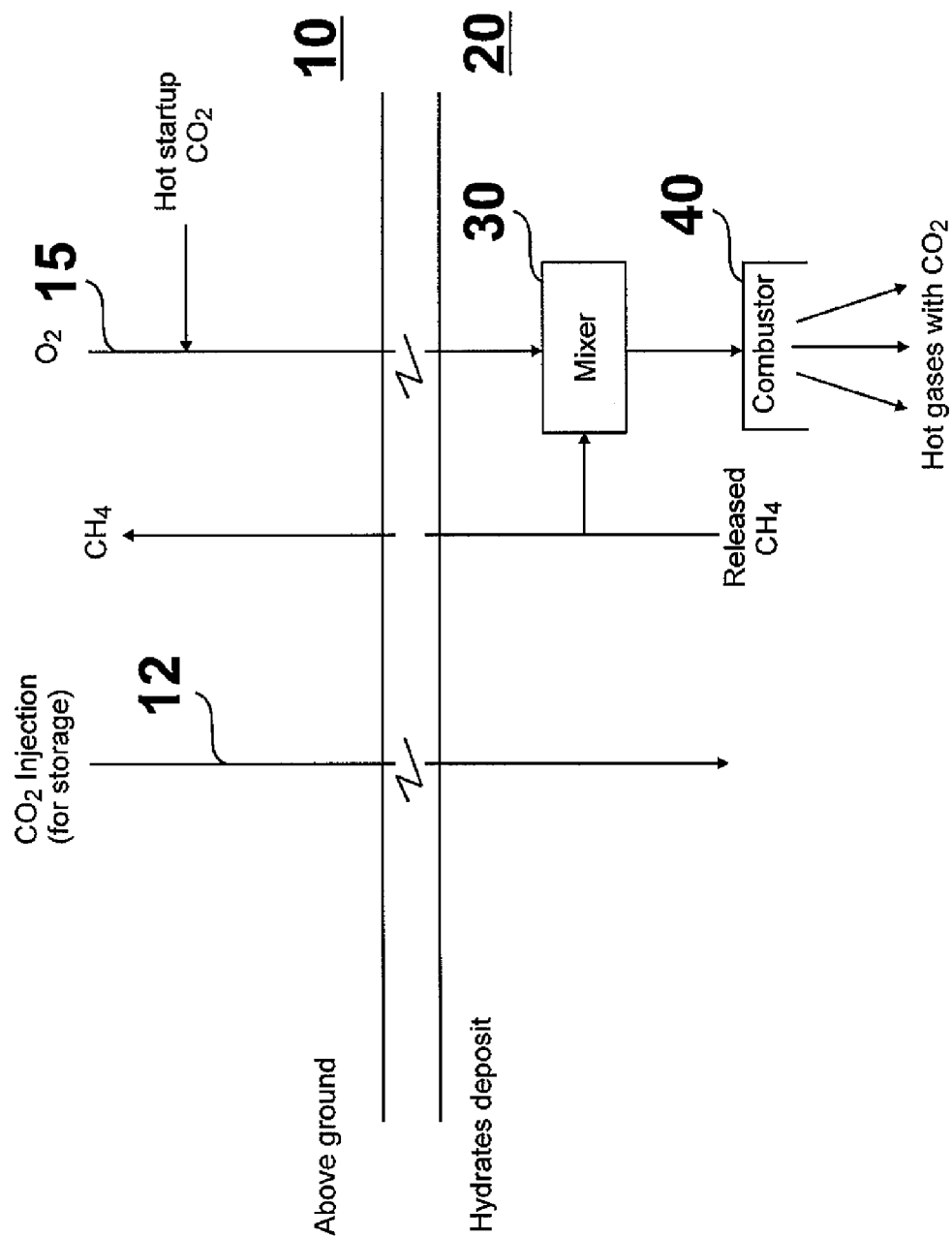
FIG. 1 is a schematic diagram of a basic system for releasing methane from a methane hydrate deposit in accordance with one embodiment of this invention.

The basic principle of this invention, shown in FIG. 1, as compared with conventional methods and systems, is the direct utilization of methane released from a methane hydrate deposit as a source of heat and carbon dioxide for sustaining the release and recovery of methane process. As shown therein, a combustion oxidant, e.g. oxygen, is introduced from above ground, generally designated as 10, through a conduit 15 into a methane hydrate deposit, generally designated as 20. The combustion oxidant is introduced into a mixer 30 proximate the methane hydrate deposit in which it is mixed with a portion of combustion methane. The resulting mixture is then introduced into a combustor 40 in which the combustion methane and combustion oxidant react, forming heated combustion products, which includes heated carbon dioxide. The heated carbon dioxide contacts the methane hydrate deposit resulting in dissociation of the methane therein and formation of $CO_2$ hydrate. A portion of the dissociated, i.e. released or displaced, methane is then captured and introduced into the mixer 30 for reaction with the incoming combustion oxidant. The remaining portion of released or displaced methane is then captured for transport and use elsewhere. No additional methane or other supplemental fuel is required to sustain the methane displacement by $CO_2$, and the entire process is carried out in-situ, i.e. proximate the methane hydrate deposit.

Figure 2:
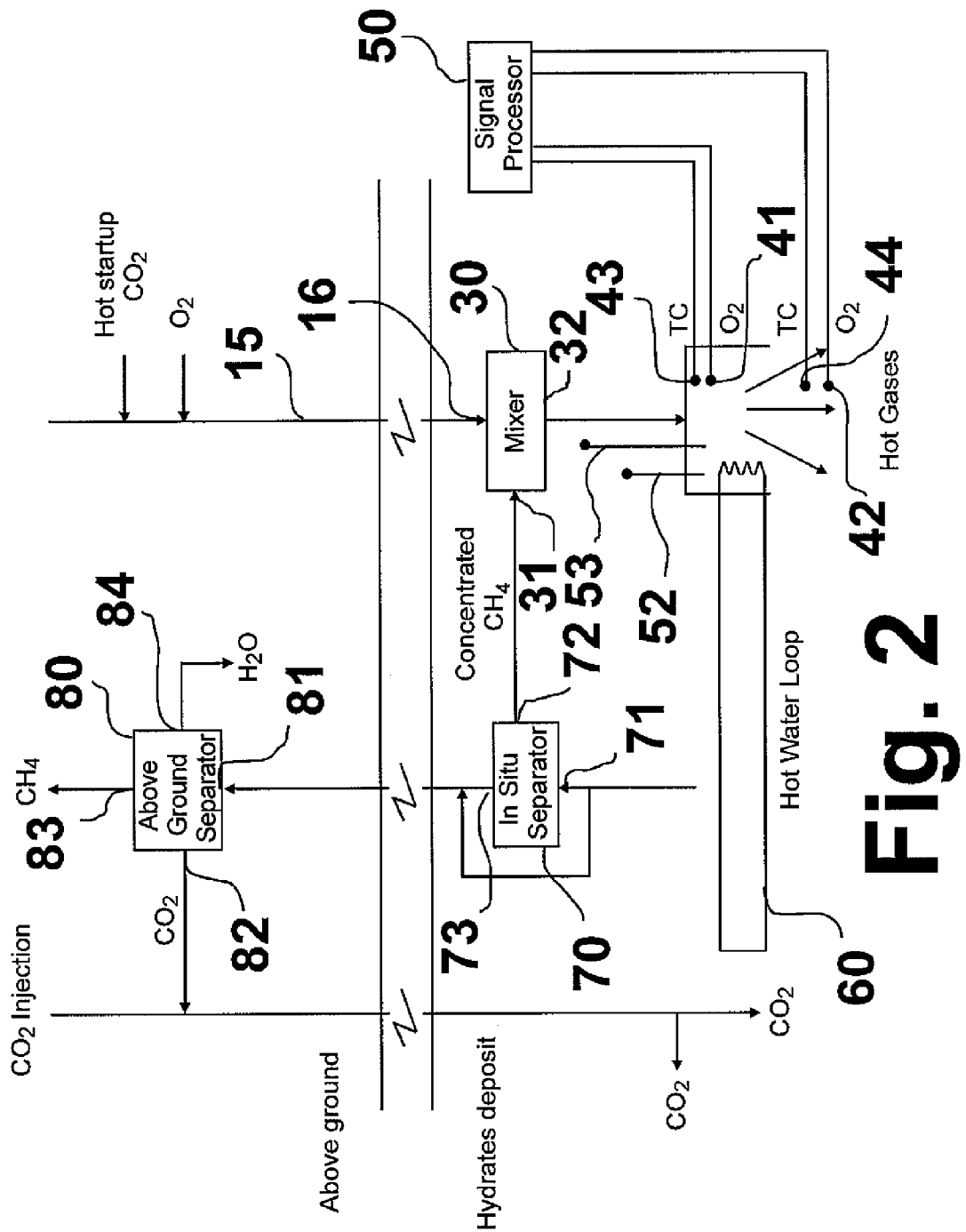
FIG. 2 is a schematic diagram of a composite system for release and recovery of methane from a methane hydrate deposit in accordance with this invention.

Initiation of the process of this invention requires the presence of "free" or "available" methane proximate the methane hydrate deposit. In the absence of "free" methane, it is necessary to "jumpstart" the process. As is apparent, a certain amount of heat is required to sustain the dissociation of methane from the methane hydrate deposit and displacement thereof by $CO_2$. It will, thus, be appreciated by those skilled in the art that, in the absence of "free" methane, an initial amount of heat must be provided to the methane hydrate deposit at the outset in order to "jumpstart" the process. This may be achieved in accordance with one embodiment of this invention by the introduction of preheated oxygen, water, steam, or other fluid and/or by providing electrically driven heat, e.g. resistance heating or electrochemical heating. The electricity may be supplied by placing an electrical storage device such as a battery or capacitor in the methane hydrate deposit or by supplying the electricity from above ground by means of electrical conductors. Such electrical conductors may be placed within or along the outer surface of the conduits used to provide the preheated fluid and/or combustion oxidant and to transport displaced methane away from the methane hydrate deposit.

Where a preheated fluid is used as a means for jumpstarting the process, the fluid is heated above ground by any of a number of known means and pumped through a conduit into the methane hydrate deposit. In accordance with one embodiment of this invention, the fluid is pumped into the methane hydrate deposit and heated therein by an electrical heater 53 (FIG. 2). In accordance with one preferred embodiment, preheated $CO_2$ is introduced from above ground, preferably through the combustion oxidant conduit, into the methane hydrate deposit, thereby releasing an initial amount of combustion methane which is captured for reaction with the combustion oxidant by means of the combustor and replacing the displaced methane with $CO_2$.

Generally, the amount of methane released from the methane hydrate deposit by the method of this invention will be greater than the amount of $CO_2$ generated by the combustion of the combustion methane, leaving voids in the deposit. As a result, there is a potential for a portion of the released methane to reform methane hydrate. To prevent this reforming of methane hydrate, $CO_2$ captured from other sources may be advantageously injected either mixed with the combustion oxidant or through a separate conduit 12 as shown in FIG. 1 into the methane hydrate deposit for sequestration, thereby forming $CO_2$ hydrate and preventing the reformation of methane hydrate.

FIG. 2 shows a composite system for releasing and recovering methane from a methane hydrate deposit in accordance with one embodiment of this invention. As shown therein, the system comprises an oxygen conduit 15 having an oxygen outlet 16 in fluid communication with a mixer 30. Mixer 30 forms a combustion methane inlet 31 for introduction of combustion methane into the mixer and a mixture outlet 32 through which a mixture of combustion oxidant and combustion methane is introduced into a combustor 40. In accordance with one embodiment of this invention, the combustor is a non-catalytic burner. In accordance with another embodiment of this invention, the combustor is a catalytic combustor. U.S. Pat. No. 6,394,791 to Smith et al. teaches a catalytic combustor suitable for use in this invention. Ignition of the mixture of combustion oxidant and combustion methane is accomplished by an igniter 52 proximate combustor 40

Control of the amount of heat released by the combustion process may be achieved in accordance with one embodiment of this invention by controlling the amount of combustion oxidant supplied for the combustion process. In accordance with one embodiment of this invention, an electro-mechanical or mechanical device, such as a valve (not shown), controlled by a signal processor 50 is used to control the flow rate of at least one of the combustion oxidant and the combustion methane. In one embodiment, an excess $O_2$ sensor 41, 42 is placed in the flame zone (41) and/or in a zone (42) downstream of the combustor to measure (and monitor) the combustion characteristics and is connected with the signal processor. If the concentration of combustion oxidant in the flame zone and/or the downstream zone increases, additional combustion methane is provided to the combustor or the combustion oxidant flow rate is decreased and vice versa.

In accordance with one embodiment of this invention, at least one temperature measurement device 43, 44, such as a thermocouple, connected with the signal processor is placed in the flame zone and/or downstream zone to measure the flame temperature, protect burner components from overheating, and/or control the oxidant/methane ratio. The temperature measurement device may be employed in combination with the excess oxygen sensor, both connected with the signal processor, to control the flow rates of the methane and/or oxidant. Additional temperature, flame UV or IR, and compositional sensors may be incorporated to measure combustion characteristics, amount and composition of methane produced, and composition and flow rate of gas to the combustor and flow rate of oxidant.

As previously indicated, one of the requirements for releasing methane from the methane hydrate deposit is heat. It will also be appreciated that the extent to which heat is introduced into the methane hydrate deposit is dependent upon the extent to which the heat of the combustion products from combustion of the methane/oxidant mixture is able to penetrate and expand outwardly from the area proximate the combustor outlet. This issue may be addressed in accordance with one embodiment of this invention by the use of a plurality of combustors disposed proximate various regions of the methane hydrate deposit. In accordance with one embodiment of this invention, a portion of the heat generated by the combustion of the methane/oxidant mixture is used to heat a heat transfer fluid, preferably water, disposed in a closed loop 60 proximate the methane hydrate deposit, as shown in FIG. 2, comprising metal or plastic conduits. The heat in the heat transfer fluid is transmitted by way of circulation of the heat transfer fluid in the closed loop to portions of the methane hydrate deposit distal from the combustor output resulting in the release of additional methane.

In accordance with one embodiment of this invention, the heat generated by the combustion process is used to preheat $CO_2$ injected into the hydrate deposit in an area distal from the combustor output, resulting in displacement of the methane by the $CO_2$. It will be appreciated by those skilled in the art that multiple combustors, $CO_2$ injectors, and methane collectors may be employed, arranged in patterns to optimize the production of methane and the storage of $CO_2$.

The methane recovered in accordance with the method of this invention typically is part of a mixture comprising, in addition to the methane, water and $CO_2$. Separation of a portion of the water and/or $CO_2$ from the methane to be used in the combustion process, thereby increasing the methane concentration, may be necessary to ensure stable combustion. Such separation may be accomplished in accordance with one embodiment of this invention using an in-situ separator 70, e.g. a membrane separator, having a mixture inlet 71, a concentrated methane outlet 72 in fluid communication with combustion methane inlet 31 of mixer 30. The mixer may be an aspirating jet mixer which aspirates combustion methane in general proportion to the oxidant; alternatively, the combustion methane may be aspirated directly into the combustion zone by the flame jet or the flame alone. After separation, the remaining $CO_2$ and water are output through a mixture outlet 73 for transport along with the remaining portion of the mixture to an above ground separator 80 having a mixture inlet 81, a $CO_2$ outlet 82, a water outlet 84, and a methane outlet 83 in which the mixture is separated into the respective three components. The separated $CO_2$ may then be injected into the methane hydrate deposit for filling in voids left by the displaced methane.

Figure 3:
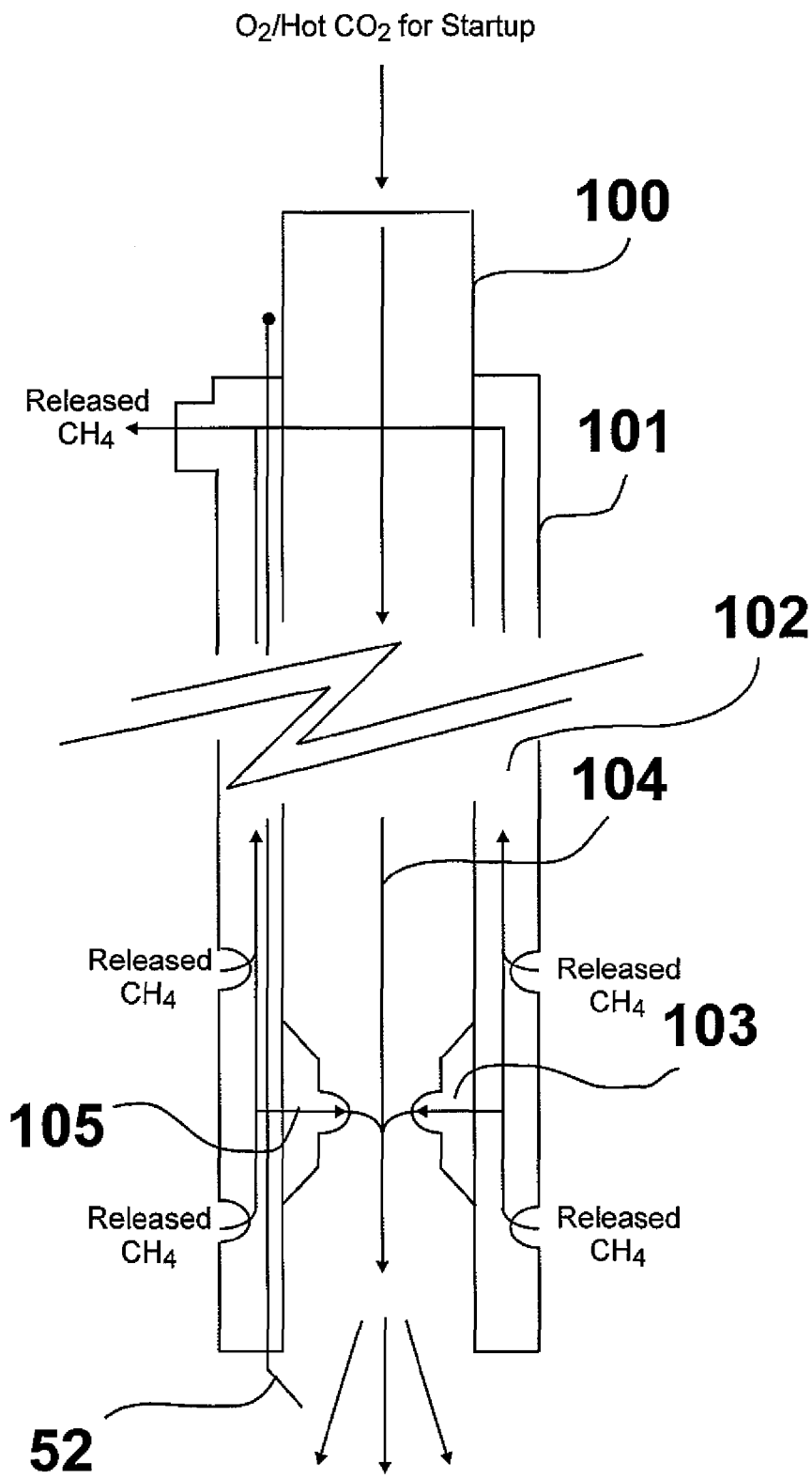
FIG. 3 is a schematic lateral view of an apparatus for releasing and recovering methane from a methane hydrate deposit in accordance with one embodiment of this invention.

In accordance with one preferred embodiment of this invention, the combustion oxidant and the released methane are injected and extracted, respectively, through two coaxial conduits 100, 101 as shown in FIG. 3, wherein the released methane is extracted from the methane hydrate deposit through the annular region 102 formed between the coaxial conduits, and the combustion oxidant (and, if necessary, preheated $CO_2$) is introduced into the mixer through the inner conduit 100. The mixer in the shown embodiment is in the form of a venturi aspirator device 103 incorporated into the inner conduit 100 to automatically proportion the flow rates of combustion oxidant, indicated by arrow 104, and combustion methane, indicated by arrow 105. It will be appreciated by those skilled in the art that other types of mixers may be employed, and such mixers are deemed to be within the scope of this invention.

As previously indicated, the combustor employed in this invention may be either a catalytic or non-catalytic combustor. In accordance with one embodiment of this invention, a combustion chamber is provided at the outlet of the combustor in which combustion is at least partially completed and from which the products of partial and/or complete combustion are injected into the methane hydrate deposit. The combustion may be stoichiometric, fuel-rich, or fuel-lean.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for release and recovery of methane from subterranean methane hydrate deposits comprising the steps of:
   providing a combustion oxidant to a combustion zone proximate a subterranean methane hydrate deposit;
   providing combustion methane from said subterranean methane hydrate deposit to said combustion zone;
   combusting said combustion methane utilizing said combustion oxidant, generating heated $CO_2$;
   introducing said heated $CO_2$ into said subterranean methane hydrate deposit, displacing methane in said subterranean methane hydrate deposit and producing displaced methane;
   diverting a portion of said displaced methane to said combustion zone for combustion utilizing said combustion oxidant; and
   recovering a remaining portion of said displaced methane.

2. The method of claim 1, wherein a preheated fluid is supplied to said subterranean methane hydrate deposit for generating an initial amount of said combustion methane.

3. The method of claim 2, wherein said fluid is heated in said methane hydrate deposit by an electrical heater.

4. The method of claim 2, wherein said preheated fluid is selected from the group consisting of $CO_2$, oxygen, water, steam, and mixtures thereof 5. The method of claim 1, wherein an initial amount of said combustion methane is generated by heating a portion of said subterranean methane hydrate deposit.

6. The method of claim 5, wherein said portion of said subterranean methane hydrate deposit is heated by at least one of electrical resistance heating and electrochemical heating.

7. The method of claim 1, wherein additional $CO_2$ is provided from an alternate source to said subterranean methane hydrate deposit for storage in portions of said subterranean methane hydrate deposit vacated by said displaced methane.

8. The method of claim 7, wherein heat generated by said combusting of said combustion methane is used to preheat said additional $CO_2$.

9. The method of claim 1, wherein heat generated by said combusting of said combustion methane is controlled by varying the amount of combustion oxidant provided to said combustion zone.

10. The method of claim 1, wherein said burning of said combustion methane is carried out at substantially stoichiometric conditions to minimize any injection of said combustion oxidant into said subterranean methane hydrate deposit.

11. A system for release and recovery of methane from subterranean methane hydrate deposits comprising:
   a combustion oxidant conduit having a combustion oxidant inlet end connected with a combustion oxidant source and having a combustion oxidant outlet end proximate a subterranean methane hydrate deposit;
   a combustor disposed proximate said subterranean methane hydrate deposit having a combustor oxidant inlet in fluid communication with said combustion oxidant outlet end, whereby combustion oxidant flowing through said combustion oxidant conduit is able to be provided to said combustor, and having a combustion methane inlet in fluid communication with said subterranean methane hydrate deposit and having a combustion products outlet end in fluid communication with said subterranean methane hydrate deposit;
   combustor ignition means for igniting said combustor; and
   a displaced methane conduit having a displaced methane inlet in fluid communication with said subterranean methane hydrate deposit.

12. The system of claim 11, wherein said combustion oxidant conduit and said displaced methane conduit are concentrically disposed, forming an annular region therebetween.

13. The system of claim 11 further comprising control means for controlling the release and recovery of said methane from said subterranean methane hydrate deposit.

14. The system of claim 13, wherein said control means comprises at least one temperature measurement means for measuring a temperature of at least one of a flame and combustion products produced by said combustor.

15. The system of claim 13, wherein said control means comprises an excess oxygen sensor positioned in one of a flame and combustion products produced by said combustor.

16. The system of claim 11, wherein said combustor is one of a catalytic combustor and a non-catalytic burner.

17. The system of claim 11, wherein a plurality of combustors are disposed proximate various regions of said methane hydrate deposit.

* * * * *